(12) United States Patent
Tarandek et al.

(10) Patent No.: US 12,304,575 B2
(45) Date of Patent: May 20, 2025

(54) STEERING SYSTEM HAVING A STEERING-FEEL UNIT

(71) Applicant: HL MANDO CORPORATION, Gyeonggi-do (KR)

(72) Inventors: Kristijan Tarandek, Neu-Isenburg (DE); Hansjoerg Feigel, Rosbach (DE); Josko Kurbasa, Waldsolms (DE)

(73) Assignee: HL MANDO CORPORATION, Gyeonggi-do (KR)

(*) Notice: Subject to any disclaimer, the term of this patent is extended or adjusted under 35 U.S.C. 154(b) by 657 days.

(21) Appl. No.: 17/631,381

(22) PCT Filed: Jul. 23, 2020

(86) PCT No.: PCT/KR2020/009725
§ 371 (c)(1),
(2) Date: Jan. 28, 2022

(87) PCT Pub. No.: WO2021/025345
PCT Pub. Date: Feb. 11, 2021

(65) Prior Publication Data
US 2022/0324506 A1    Oct. 13, 2022

(30) Foreign Application Priority Data

Aug. 2, 2019   (DE) .................... 10 2019 211 644.2

(51) Int. Cl.
*B62D 5/00*   (2006.01)
*B62D 1/181*   (2006.01)
*B62D 6/02*   (2006.01)

(52) U.S. Cl.
CPC ............. *B62D 5/005* (2013.01); *B62D 1/181* (2013.01); *B62D 6/02* (2013.01)

(58) Field of Classification Search
CPC ........... B62D 5/005; B62D 1/181; B62D 6/02
See application file for complete search history.

(56) References Cited

U.S. PATENT DOCUMENTS 9,914,473 B2    3/2018  Tamaizumi et al.
2007/0023244 A1*  2/2007  Carlson .................. D06F 37/20
                                                    188/267

(Continued)

FOREIGN PATENT DOCUMENTS

JP    2004-182062    7/2004
JP    2005-343298    12/2005

(Continued)

OTHER PUBLICATIONS

International Search Report for PCT/KR2020/009725 mailed on Nov. 17, 2020 from WIPO (now published as WO 2021/025345).

(Continued)

*Primary Examiner* — Anne Marie M Boehler
*Assistant Examiner* — Marlon A Arce
(74) *Attorney, Agent, or Firm* — WOMBLE BOND DICKINSON (US) LLP

(57) ABSTRACT

The present invention relates to a steering system for a vehicle, the steering system comprising a steering unit comprising a steering wheel; a steering-feel unit for generating a steering reaction force when the steering wheel is rotated, the steering-feel unit comprising at least one spring coupled to the steering wheel, and an actuator for changing a spring loading and/or spring stiffness of the at least one spring. The steering system further comprises a position sensor for measuring an angular position of the steering wheel and/or a speed sensor for measuring a vehicle speed; and a control unit for controlling the actuator, the control unit operationally coupled to the actuator and to the position sensor and/or the speed sensor, wherein the actuator is configured to change the spring loading and/or spring stiffness depending on the angular position of the steering wheel and/or the vehicle speed.

11 Claims, 4 Drawing Sheets

(56) References Cited

U.S. PATENT DOCUMENTS

2015/0057890 A1* 2/2015 Tamaizumi ............ B62D 6/008
                                                    701/41
2020/0231209 A1* 7/2020 Walentowski .......... G01L 5/221

FOREIGN PATENT DOCUMENTS

| JP | 2006-231973 | | 9/2006 |
| KR | 1999-000618 | | 1/1999 |
| KR | 100362791 | * | 7/1999 |

OTHER PUBLICATIONS

Written Opinion of the International Searching Authority for PCT/KR2020/009725 mailed on Nov. 17, 2020 from WIPO (now published as WO 2021/025345).

Office Action dated Dec. 16, 2023 for Korean Patent Application No. 10-2022-7003503 and its English translation from Global Dossier.

* cited by examiner

[Figure 1]
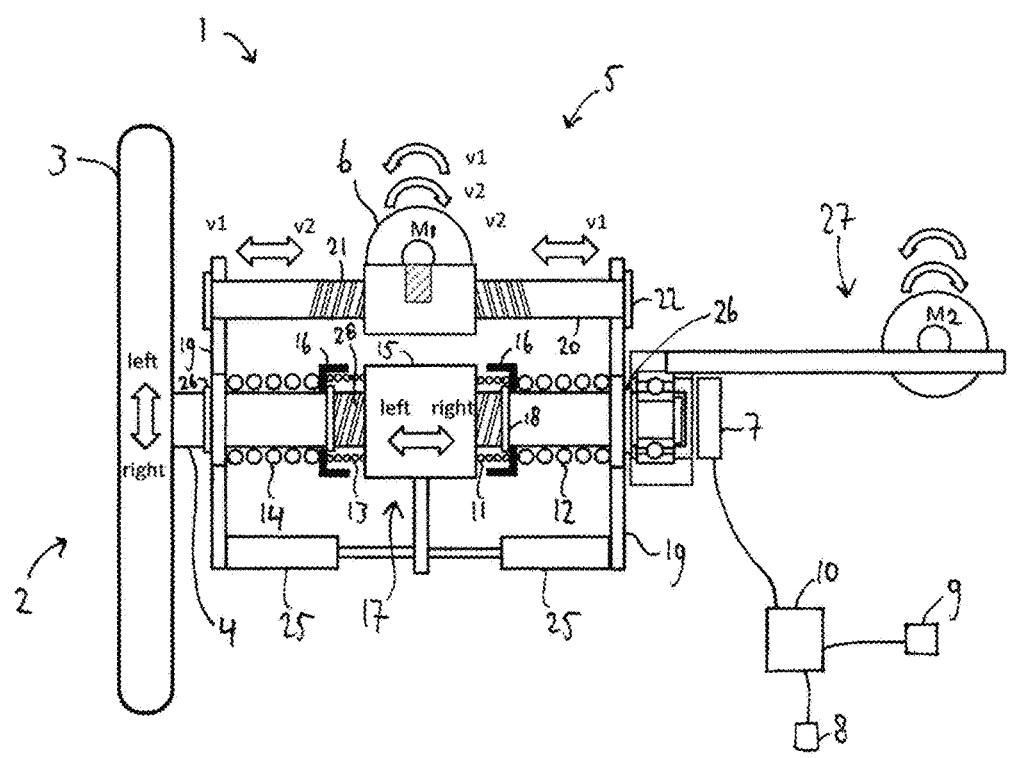

[Figure 2]
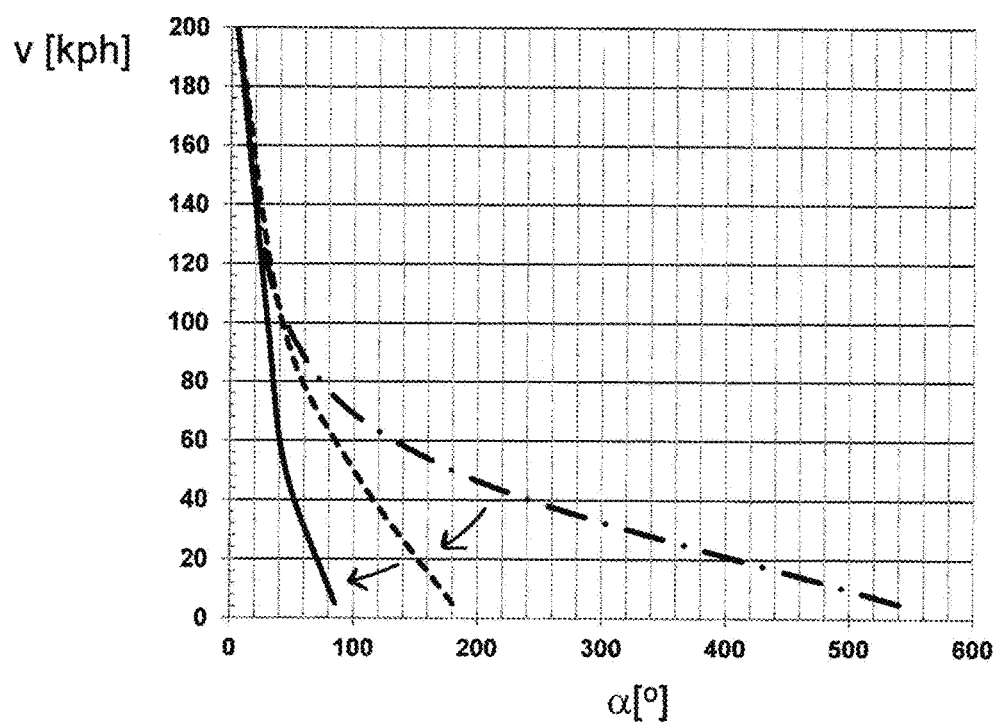

[Figure 3]
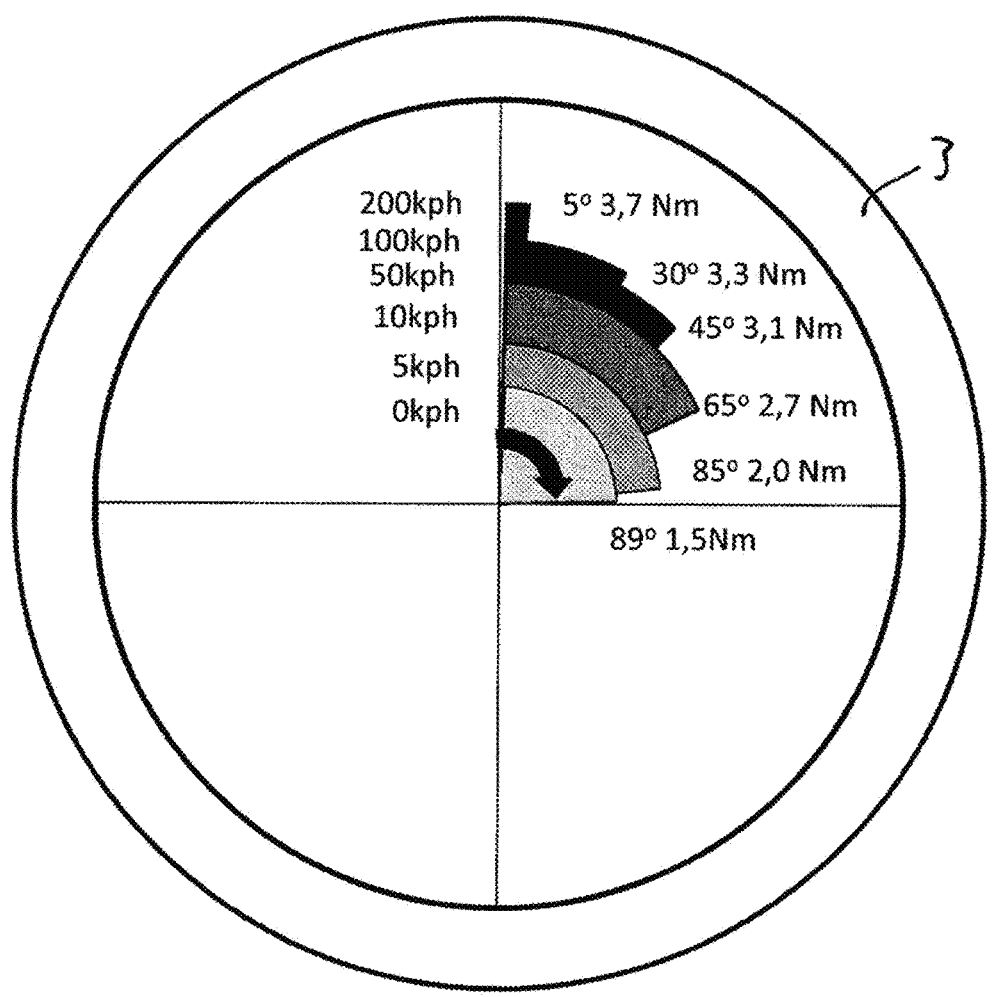

[Figure 4]
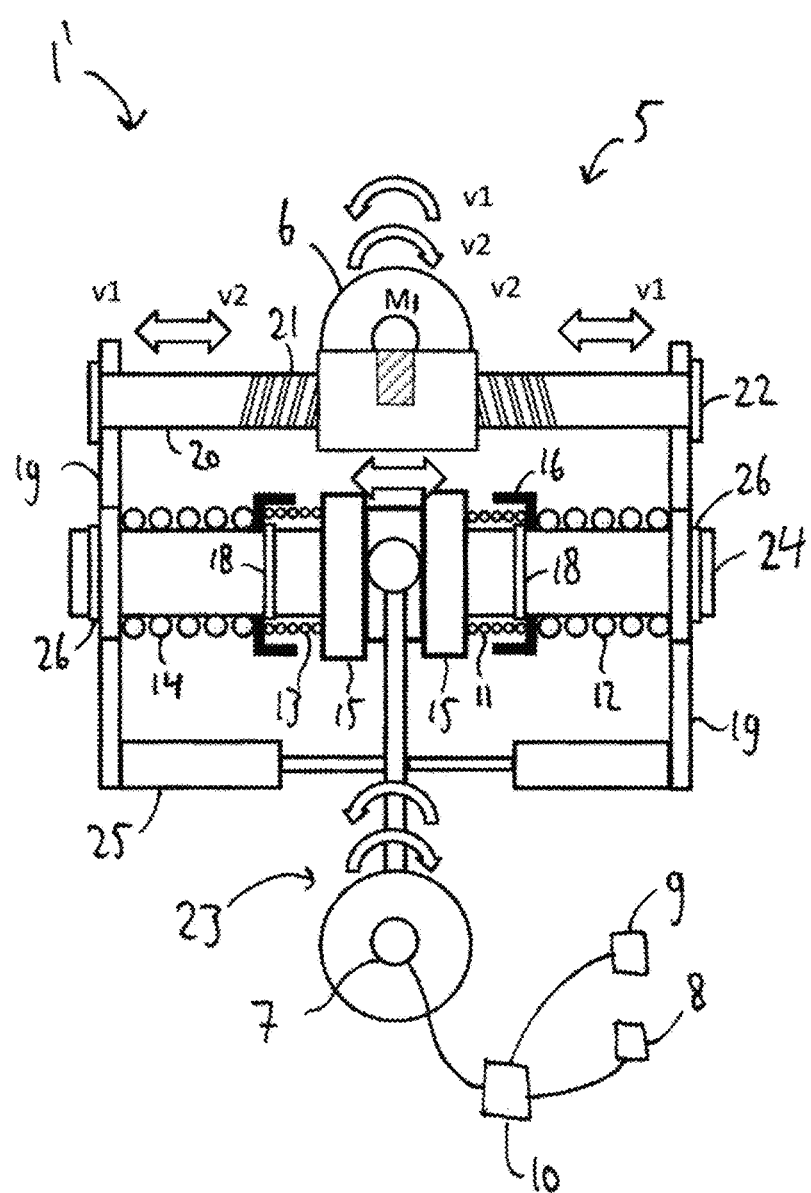

STEERING SYSTEM HAVING A STEERING-FEEL UNIT

CROSS-REFERENCE TO RELATED APPLICATIONS

The present application is the national stage of International Patent Application No. PCT/KR2020/009725 filed on Jul. 23, 2020, which claims the priority to German Patent Application No. 10 2019 211 644.2 filed in the German Intellectual Office on Aug. 2, 2019, the entire contents of which are incorporated herein by reference.

TECHNICAL FIELD

The present invention relates to a steering system for a vehicle having a steering-feel unit. In particular, the steering system may be a part of a steer-by-wire system.

BACKGROUND ART

In conventional steering systems for a vehicle, such as manual or power steering systems, the steering wheel is mechanically coupled to the road wheels by a particular mechanism, such as a rack and pinion subsystem. These systems may have inherent shortcomings, such as the complexity and weight of the mechanical coupling between the steering wheel and the road wheels, and the limited tunability of steering feedback.

Steering feedback is an expected attribute of a vehicle, based on the existence of steering feedback in every vehicle using a conventional mechanical coupling between the steering wheel and the road wheels. Insufficient steering feedback may give the driver of the vehicle a sense of disconnection with the road, which is typically a negative attribute.

Various steer-by-wire systems, which omit the mechanical coupling between the steering wheel and the road wheels, are also known in the art. Due to the lack of said mechanical coupling, these systems inherently lack steering feedback and should therefore have additional subsystems to provide sufficient steering feedback. Although various steering feedback solutions for steer-by-wire systems are known in the art there is an ongoing need to improve steering feedback to the driver of the vehicle in steer-by-wire systems. For a safe and secure operation of the steering system it would be advantageous if the steering feedback can be provided in a robust and straightforward manner. It would also be beneficial to provide additional steering feedback in conventional steering systems or to improve steering feedback in conventional steering systems.

DISCLOSURE

Technical Problem

The present invention has been made to solve at least one of the above mentioned objects.

Technical Solution

According to claim 1, a steering system for a vehicle is provided, comprising:
a steering unit comprising a steering wheel; and
a steering-feel unit for generating a steering reaction force when the steering wheel is rotated. The steering-feel unit comprises
at least one spring coupled to the steering wheel, and
an actuator for changing a spring loading and/or spring stiffness of the at least one spring.

The steering system further includes
a position sensor for measuring an angular position of the steering wheel and/or a speed sensor for measuring a vehicle speed; and
a control unit for controlling the actuator, the control unit operationally coupled to the actuator and to the position sensor and/or the speed sensor. The actuator is configured to change the spring loading and/or spring stiffness depending on the angular position of the steering wheel and/or the vehicle speed.

By changing the spring loading and/or the spring stiffness in accordance with claim 1, the steering reaction force can be generated based on an actual angular position of the steering wheel and/or the actual vehicle speed. Thus, the resistance of the springs to a steering action can be dynamically varied by the control unit and the actuator. Moreover, the steering-feel unit of claim 1 has a relatively straightforward design and can be manufactured in a relatively robust manner.

The term "steering reaction force" may refer to steering-feel or steering feedback to the driver of the vehicle. In lieu of steering reaction force, the term steering reaction torque may also be used. The steering system claimed may be part of a steer-by-wire system. However, the steering system of claim 1 may also be implemented in conventional manual or power steering systems using a mechanical coupling between the steering wheel and the road wheels.

According to an embodiment, the actuator is configured such that, when the steering angle increases and/or the vehicle speed increases, the actuator changes the spring loading and/or spring stiffness such that the steering reaction force increases. Furthermore, the actuator may be configured such that, when the steering angle decreases and/or the vehicle speed decreases, the actuator changes the spring loading and/or spring stiffness such that the steering reaction force decreases. For example, the actuator may be configured for changing the spring loading and/or spring stiffness during and/or before and/or after a steering action.

According to various embodiments, the steering system comprises at least one additional sensor for sensing a further steering condition and/or a vehicle condition and/or a road condition. The sensor may be operationally coupled to the control unit. The actuator can be configured to change the spring loading and/or spring stiffness depending on signals of the additional sensor. The additional sensor may be, for instance, a steering sensor, such as a torque sensor, a vehicle sensor or a road sensor.

The steering unit may be mechanically coupled to the steering-feel unit via a coupling mechanism. In some instances, the steering unit comprises a steering shaft coupled the steering wheel. In this case, the position sensor may be configured for measuring an angular position of the input shaft. The steering unit may be mechanically coupled to the coupling mechanism such that a rotational movement of the steering wheel is converted to a translational movement of the coupling mechanism or a rotational movement of the coupling mechanism.

The steering system may comprise a first force transmission element and/or a first torque transmission element for coupling the steering wheel to the at least one spring. Thus, the first force or torque transmission element enables transmitting a spring force or torque to the steering wheel and vice versa. Moreover, the steering system may include a second force transmission element and/or a second torque transmission element for coupling the actuator to the at least one spring. Thus, the second force or torque transmission element enables transmitting a force or torque from the actuator to the spring and vice versa. It may be envisaged that the at least one spring is disposed between two moveable force transmission elements or torque transmission elements. The first force or torque transmission element may be moveable by operating the steering wheel. Further, the second force or torque transmission element may be moveable by operating the actuator. Depending on the nature of the spring coupled the force or torque transmission element may be translationally or rotationally moveable.

In some embodiments, the at least one spring has a non-linear spring rate. This may assist in providing a steering reaction force that increases with increasing vehicle speed or steering angle or providing a steering reaction force that decreases with decreasing vehicle speed or steering angle. For instance, depending on the design of the system the spring rate of the at least one spring may be progressive or degressive. Alternatively, the spring rate of the at least one spring may be linear at least in the operating range of the respective spring. At least two springs may have different spring rates. The at least one spring can be designed for different kinds of loadings, such as a tensile loading and/or for a compressive loading and/or a torsional loading and/or a shear loading and/or a bending loading. The at least one spring may be a helical spring (coil spring), a disc spring, a torsion spring, a spiral spring or another suitable spring.

Preferably, the at least one spring biases the steering wheel towards its center position in which the angular position of the steering wheel is zero. Optionally, the at least one spring is preloaded in the center position of the steering wheel.

According to an implementation form, the steering-feel unit includes at least two springs.

In some instances, at least two springs are counteracting springs disposed on opposite sides of the first force transmission element or the first torque transmission element.

The steering-feel unit may comprise a first plurality of springs and a second plurality of springs. The first plurality of springs may substantially provide the desired steering reaction force when the steering wheel is rotated to the left, while the second plurality of springs may substantially provide the desired steering reaction force when the steering wheel is rotated to the right. For instance, the first plurality of springs may be disposed on a first side of the first force or torque transmission element and the second plurality of springs may be disposed on a second side of the first force or torque transmission element. The design of the springs (e.g. number of springs, spring rates, materials) may be symmetric on both sides of the first force transmission element or the first torque transmission element.

In various embodiments, at least two springs are arranged in series at the same side of the first force transmission element or the first torque transmission element. For instance, at least two springs are arranged in series between the first force or torque transmission element and the second force or torque transmission element. The springs being arranged in series on the same side of the first force or torque transmission element may have different spring rates. The steering-feel unit may include a stop disposed between the springs arranged in series for limiting the spring loading of at least one of the springs. By limiting the load of at least one of the springs that are connected in series, the effective spring rate of the system can be tuned. The stop may be moveably, e.g. slidably, disposed on a shaft. The shaft may be the above mentioned steering shaft or a different shaft. Axial movement of the stop can be limited by an abutment feature arranged on the shaft.

In various implementations, the steering-feel unit comprises at least one damper for dampening movement of the steering wheel. The damper may be a fluidic or electromechanic damper. The damper may be configured such that damping forces increase with an increasing steering wheel angle.

The steering system may further comprise a stow mechanism for stowing the steering-feel unit and/or the steering unit.

Advantageous Effects

The steering system for a vehicle having a steering-feel unit according to the various embodiments of the present disclosure can provide in a robust and straightforward manner and additional steering feedback in conventional steering systems or to improve steering feedback in conventional steering systems.

DESCRIPTION OF DRAWINGS

Various objects and advantages of the present invention will become apparent to those skilled in the art from the following detailed description of embodiments, when read in light of the accompanying drawings.

There are shown in

FIG. 1 a schematic diagram of a steering system;

FIG. 2 several relationships between vehicle speed and steering wheel angle;

FIG. 3 several relationships between vehicle speed, steering wheel angle and steering wheel torque;

FIG. 4 a schematic diagram of a further steering system.

BEST MODE

In the following, recurring and similar features in this and in the subsequent representations are provided with the same reference numerals.

FIG. 1 shows a schematic diagram of an exemplary steering system 1 for use in a road vehicle in accordance with an embodiment of the present invention. The steering system 1 comprises a steering unit 2 with a steering wheel 3 and a steering shaft 4 rotationally fixed to the steering wheel 3. The steering system 1 may be part of a steer-by-wire steering system in which the steering wheel 3 is mechanically decoupled from the road wheels. The steering system may also comprise a road wheel actuating unit (not shown) for turning at least one road wheel. The steering system 1 may comprise a mechanical fall-back system in case the steer-by-wire system has a failure. The mechanical fall-back system may comprise a mechanical coupling between the steering wheel 3 and the road wheels that is activated in case of a failure of the steer-by-wire system. A typical mechanical fall-back system can comprise a rack and pinion and may be found in U.S. Pat. No. 9,764,760 B2.

Alternatively, the steering system 1 may be part of a conventional steering system in which the steering wheel 3 is mechanically coupled to the road wheels (not shown).

A position sensor 7 measures an angular position of the steering wheel during operation of the steering system. For example, a circumference portion of the shaft 4 may comprise a magnetized portion having a north pole and a south pole. The angular position sensor 7 can measure the magnetic field to determine the angular position of the shaft 4, and thus, of the steering wheel 3. The resolution of the sensor 7 may be 2° or 1° or even more accurate.

Furthermore, a speed sensor 8 is envisaged for measuring a vehicle speed. For example, the speed sensor 8 measures the number of revolutions of the road wheels per time unit. A conventional speed sensor 8 may be used for measuring the vehicle speed.

Both the position sensor 7 and the speed sensor 8 are operationally coupled to a control unit 10. The control unit 10 receives signals or data from the sensors 7, 8 and is configured to process, interpret, analyze and/or store them. The control unit 10 may be a steering system control unit having dedicated software and hardware to control the steering system 1 and any subsystems thereof. In other embodiments, the control unit 10 is part of the ECU of the vehicle. The control unit 10 is also operatively connected to the road wheel actuating unit.

Based on the signals of this position sensor 7 the control unit 10 calculates a road wheel steering target position and sends a corresponding signal to the road wheel actuating unit for turning (steering) the road wheels. The rate of road wheel steering position change relative to the rate of steering wheel target position change may define a virtual gear ratio. The virtual gear ratio can be variable with the vehicle speed measured by the speed sensor 8. The virtual gear ratio can be applied such that for a full turning of the road wheels in one direction the steering wheel 3 has to be turned by less than 180 degrees or less than 90 degrees. This allows using a simple and compact position sensor 7 which has not to be designed for steering wheel turns over 360 degrees or 180 degrees in total. In other words, the number of revolutions of the shaft 4 does not need to be determined.

Because of the lack of the mechanical coupling between the road wheels and the steering wheel a steering-feel unit 5 is envisaged for generating a steering reaction force (steering feedback) when the steering wheel 3 is rotated.

The steering-feel unit 5 comprises a plurality of springs 11, 12, 13, 14 that are mechanically coupled to the steering wheel 3. Preferably, the springs 11, 12, 13, 14 bias the steering wheel 3 towards its center position in which the angular position of the steering wheel is zero. In the center position of the steering wheel the vehicle travels along a straight line. Further, the road wheel actuating unit may be in a rest position when the steering wheel is in its center position. The springs 11, 12, 13, 14 provide a steering feedback to the driver of the vehicle when the steering wheel 3 is rotated from its center position towards an angular position greater than zero.

The steering-feel unit 5 further includes an actuator 6 operatively connected to the control unit 10. The control unit 10 controls and activates the actuator 6 based on the signals or date of the sensors 7, 8. The actuator 6 is configured for actively changing an actual spring loading and/or an actual spring stiffness of the springs 11, 12, 13, 14 depending on the angular position of the steering wheel 3 measures by the position sensor 7 and/or the vehicle speed measured by the speed sensor 8. The actuator 6 may comprise a sensor connected to the control unit 10 for sensing an operational state of the actuator.

In particular, the actuator 6 is configured such that, when the steering angle α increases and/or the vehicle speed increases, the actuator 6 changes the spring loading and/or spring stiffness of the springs 11, 12, 13, 14 such that the steering reaction force increases. Further, when the steering angle α decreases and/or the vehicle speed decreases, the actuator 6 changes the spring loading and/or spring stiffness such that the steering reaction force decreases.

The springs 11, 12, 13, 14 can be designed for a tensile loading and/or for a compressive loading and/or a torsional loading and/or a shear loading and/or a bending loading. In the embodiment shown, the springs 11, 12, 13, 14 are designed for a compressive loading and a tensile loading. The springs 11, 12, 13, 14 may have non-linear spring rates (sometimes referred to as spring characteristics). In the example shown, the springs 11, 12, 13, 14 have progressive spring rates. In alternative embodiments, the springs have degressive spring rates or linear spring rates. Optionally, each of the springs 11, 12, 13, 14 is preloaded in the center position of the steering wheel 3.

The steering-feel unit 5 can comprise a first force transmission element 15. At both sides of the first transmission element 15 are provided a second force transmission element 19 and a mechanical stop 16. The springs 11, 12, 13, 14, the first and second force transmission elements 15, 19 and the stops 16 are moveably, e.g. slidably, disposed on the shaft 4. Springs 11, 12 and springs 13, 14 are counteracting springs disposed on opposite sides of the first force transmission element 15. That is, when springs 11, 12 are compressed, springs 13, 14 are stretched are and vice versa. For instance, springs 11 and 13 may form a first pair of counteracting springs and springs 12 and 14 may form a second pair of counteracting springs.

For instance, the actuator 6 can be an electric actuator and may comprise a brush motor M1 and a worm gear. The worm gear may comprise an axially moveable shaft 20 having a threaded portion 21 and a flanged end portion 22. The shaft 20 is connected to the force transmission element 19 and extends through an aperture thereof. Thus, rotary movement of the motor M1 is converted into a linear motion of a force transmission element 19 (see below). If a torque transmission element is used instead of the force transmission element 19, a rotary movement of the motor M1 could be directly coupled to said torque transmission element.

In the example shown, two shafts 20 and two second force transmission elements 19 are envisaged. By moving the second force transmission elements 19 towards the first force transmission element 15 loading, preloading and the stiffness of the springs 11, 12, 13, 14 can be actively adjusted by the actuator 6.

The force transmission element 15 is part of a coupling mechanism 17 for mechanically coupling the steering wheel 3 to the steering-feel unit 5. In FIG. 1 a rotational-translational coupling mechanism 17 is shown. For instance, the steering shaft 4 can comprise a threaded portion 28 which is mechanically coupled to the first force transmission element 15. To this end, the first force transmission element 15 may comprise a complementary threaded portion that engages the threaded portion 28 of the steering shaft 4. According to FIG. 1, when the steering wheel 3 is rotated to the left (see "left/right" arrow at the steering wheel 3), the first force transmission element 15 is moved to the left (see "left/right" arrow at the first force transmission element 15). Other mechanical couplings, such as rotational-rotational couplings, between the steering unit and the first force transmission element 15 or the steering-feel unit 5 may also be contemplated. Instead of the force transmission element 15, a torque transmission element may be envisaged, for example if torsional springs are used in the steering-feel unit 5.

In many practical applications, at low vehicle speeds it is advantageous to provide a smaller steering feedback than at higher vehicle speeds. Conversely, at high vehicle speeds it may be advantageous to provide a higher steering reaction force than at lower vehicle speeds. In FIG. 1 two exemplary vehicle speeds v1 and v2 are indicated, where v1 is a first vehicle speed (e.g. 0-20 km/h) and v2 is a second vehicle speed (e.g. between 100-200 km/h) being higher than the first vehicle speed v1.

In the following, for ease of description, the right part of FIG. 1 is described. When the speed sensor 8 measures the high vehicle speed v2, the motor M1 is rotated to the right. This has the effect that the second force transmission element 19 is moved towards the first transmission element 15 thereby compressing springs 11 and 12 and increasing their spring loadings and spring stiffness. In a similar manner, springs 13 and 14 are compressed by moving the left force transmission element 19 towards the first force transmission element 15.

If the driver decides to rotate the steering wheel 3 to the right, the first force transmission element 15 will be moved towards the second force transmission element 19. As the spring loading and the spring stiffness of the combined springs 11, 12 is increased, the driver will experience a higher steering reaction force at the higher vehicle speed v2.

Conversely, if the speed sensor 8 measures the low vehicle speed v1, the motor M1 is rotated to the left. This has the effect that the second force transmission elements 19 are moved away from the first transmission element 15 thereby longitudinally expanding springs 11, 12 and 13, 14 and decreasing their spring loadings and spring stiffnesses. If the driver decides to rotate the steering wheel 3 to the right (see arrow at the steering wheel 3), the first force transmission element 15 will be moved towards the second force transmission element 19 (see arrow at the first transmission element 15). As the spring loading and the spring stiffness of the combined springs 11, 12 are decreased, the driver will experience a lower steering reaction force at the higher vehicle speed v1 than at the vehicle speed v2.

FIG. 3 shows several preferred relationships between vehicle speed, steering angle α and steering reaction force, wherein the steering reaction force is presented in Nm (steering reaction torque). In FIG. 2, three relationships between vehicle speed and steering wheel angle are shown. FIG. 2 indicates that the steering angle a can be decreased by using a smaller steering reaction force at lower vehicle speeds by virtue of the steering system of the FIG. 1.

In other examples, pneumatic and/or hydraulic actuators may be used. It should be mentioned that the present invention is not limited to a particular actuator or actuating mechanism as long as the actuator can actively alter the loading, preloading and the stiffness of at least one spring such as springs 11, 12, 13, 14.

The force transmission element 19 couples the actuator 6 to the springs 12, 14. Depending on the actuator and the springs in alternative embodiments a torque transmission element may be used instead of the force transmission element 19.

The stops 16 are moveably arranged on the shaft 4. Axial movement of the stops 16 may be limited in one direction by a first flange 18 extending radially from a circumference of the shaft 4. Further, axial movement of the second force transmission element 19 is limited by a second flange 26 extending radially from a circumference of the shaft 4.

Each of the springs 11, 13 is sandwiched between the first force transmission element 15 and one of the mechanical stops 16 for limiting loading of the springs 11, 13. The springs 11, 13 abut both the force transmission element 15 and the stop 16. Each of the springs 12, 14 is sandwiched between the second force transmission element 19 and one of the mechanical stops 16. The springs 12, 14 abut both the force transmission element 19 and the stop 16.

As shown, the springs 11, 12 and the springs 13, 14 are arranged in series at both sides of the first force transmission element 15. Generally, the springs 11, 13 have the same spring rate which is labelled as first spring rate $k_1$. Further, the springs 12, 14 may have the same spring rate which is depicted as second spring rate $k_2$. For example, the equivalent spring rate $k_{eq}$ at the right side of the force transmission element 15 can be determined via the equation $1/k_{eq}=1/k_1+1/k_2$, where $k_1$ and $k_2$ are the first and second spring rates, respectively. It is noted that the equivalent spring rate of the overall system has a more complex form. The first spring rate and the second spring rate deviate from each other. Preferably, the first spring rate $k_1$ is smaller than the second spring rate $k_2$ at a certain force applied. For this reason, at a steering action, the springs 11, 13 will be compressed to a greater extent than the springs 12, 14. This has the effect that the first force transmission element 15 approaches the mechanical stop during a steering action and at a certain steering angle the first force transmission element 15 abuts the mechanical stop 16. Thus, further compression of springs 11, 13 is limited by the stop 16. Consequently, the equivalent spring rate at one side of the first transmission element 15 $k_{eq}$ can be approximately determined solely by the spring 12 (or spring 14) at this certain steering angle and higher steering angles. Generally, this can contribute to a higher steering reaction force at higher steering angles.

In addition to sensors 7, 8, the steering system 1 may comprise at least one further sensor 9 for sensing a steering condition and/or a vehicle condition and/or a road condition. The sensor 9 is operationally coupled to the control unit 10. Sensor signals or sensor date of sensor 9 may be used for controlling the actuator to adjust the spring loading and/or spring stiffness.

Thus, the actuator 6 can also be used for steering condition related feedback, road condition (e.g. road surface) related steering feedback or vehicle condition related steering feedback, in a way that sudden force changes at the measured by the sensor 9 will be transferred to steering feedback changes at the steering wheel 3.

Examples of the at least one further sensor 9 include a torque sensor disposed at the steering shaft 4, a vehicle lateral acceleration sensor, and a vehicle yaw rate sensor, which preferably sense steering torque, a vehicle lateral acceleration, and a vehicle yaw rate, respectively. The vehicle lateral acceleration, and vehicle yaw rate are preferred measurements that indicate the current dynamic status of the vehicle. The additional sensor 9 may also include an ignition mode sensor that senses the ignition mode of the vehicle, and a vehicle roll sensor and a vehicle pitch sensor, which sense the vehicle roll and vehicle pitch of the vehicle, respectively.

FIG. 4 shows a schematic diagram of an exemplary steering system 1' in accordance with a further embodiment of the present invention. For clarity, the steering wheel 3 is not shown in FIG. 4. The embodiment shown in FIG. 4 deviates from the embodiment shown in FIG. 1 in that a rotational movement of the steering wheel 3 is converted to a rotational movement of the coupling mechanism 23. This may result in a more compact steering system 1'. Further, elements 11, 12, 13, 14, 15, 16 are slidably disposed on shaft 24 which differs from the steering shaft 4. It should be mentioned that the steering wheel 3 is not rotationally fixed to the shaft 24. The operation principle of at least elements 6, 7, 8, 9, 10, 11, 12, 13, 14, 15, 16, 18, 19, 20, 21, 22 of steering system 1' is similar to or even identical with the respective elements of steering system 1 described in detail above.

Both steering systems 1, 1' may also include at least one damper 25 for dampening movement of the steering wheel 3. For instance, the dampers 25 may be fluidic or electro-mechanic dampers. The dampers 25 may be configured such that damping forces increase with an increasing steering wheel angle a.

The steering systems 1, 1' may further comprise a stow mechanism 27 having a motor M2 for stowing or displacing the steering-feel unit 5 and/or the steering unit (cf. FIG. 1). The stow mechanism 27 may be mechanically or electro-mechanically realized. By using the stow mechanism 27 the steering wheel 3 may be retracted into or driven out of the vehicle's dashboard. The stow mechanism 27 can optionally be used for adaption of the steering wheel 3 to a driver's seat position. The electro-mechanical stow mechanism 27 can be optionally used for electro-mechanically change of the spring loading/spring stiffness of springs 11, 12, 13, 14.

In some embodiments, the steering wheel 3 can be rotationally blocked in certain situations, for instance, to support the driver during disembarking from the vehicle. In some instances, the stow mechanism 27 can be used for rotationally blocking the steering wheel 3.

Any features shown in the FIGS. 1-4 may be combined with each other or may be separately claimed.

The invention claimed is:

1. Steering system for a vehicle, the steering system comprising:
   a steering unit comprising a steering wheel;
   a steering-feel unit for generating a steering reaction force when the steering wheel is rotated, and comprising at least one spring coupled to the steering wheel, and an actuator for changing a spring loading and/or spring stiffness of the at least one spring;
   a position sensor for measuring an angular position of the steering wheel and/or a speed sensor for measuring a vehicle speed; and
   a control unit for controlling the actuator, the control unit operationally coupled to the actuator and to the position sensor and/or the speed sensor,
   wherein the actuator is configured to change the spring loading and/or spring stiffness depending on the angular position of the steering wheel and/or the vehicle speed,
   wherein the steering unit is mechanically coupled to the steering-feel unit via a coupling mechanism, and
   wherein a rotational movement of the steering wheel is converted to a translational movement of the coupling mechanism or a rotational movement of the coupling mechanism.

2. The steering system according to claim 1, wherein the actuator being configured such that, when the steering angle ($\alpha$) increases and/or the vehicle speed increases, the actuator changes the spring loading and/or spring stiffness such that the steering reaction force increases, and when the steering angle ($\alpha$) decreases and/or the vehicle speed decreases, the actuator changes the spring loading and/or spring stiffness such that the steering reaction force decreases.

3. The steering system according to claim 1, further comprises:
   a first force transmission element and/or a first torque transmission element for coupling the steering wheel to the at least one spring; and/or
   a second force transmission element and/or torque transmission element for coupling the actuator to the at least one spring.

4. The steering system according to claim 3, wherein the steering-feel unit comprises at least two springs, and the at least two springs are counteracting springs disposed on opposite sides of the first force transmission element or the first torque transmission element.

5. The steering system according to claims 3, wherein the steering-feel unit comprises at least two springs, and the at least two springs are arranged in series between the first force transmission element and the second fore transmission element.

6. The steering system according to claim 5, wherein the steering-feel unit comprising a stop disposed between the springs arranged in series for limiting the spring loading of at least one of the springs.

7. The steering system according to claim 6, wherein the stop is moveably disposed on a shaft, and axial movement of the stop is limited by an abutment feature arranged on the shaft.

8. The steering system according to claim 1, wherein the steering-feel unit comprises at least two springs, and the at least two springs have different spring rates.

9. The steering system according to claim 1, wherein the at least one spring biases the steering wheel towards its center position in which the angular position of the steering wheel is zero, and the at least one spring is preloaded in the center position of the steering wheel.

10. The steering system according claim 1, wherein the at least one spring is disposed between two moveable force or torque transmission elements, the first force or torque transmission element being moveable by operating the steering wheel, the second force or torque transmission element being moveable by operating the actuator.

11. The steering system according to claim 1, wherein the steering system comprises at least one additional sensor for sensing a vehicle condition and/or a road condition, the sensor being operationally coupled to the control unit, and
   wherein the actuator is configured to change the spring loading and/or spring stiffness depending on signals of the additional sensor.

* * * * *